(12) United States Patent  
Mountain et al.

(10) Patent No.: US 9,338,513 B2  
(45) Date of Patent: *May 10, 2016

(54) APPARATUS, SYSTEMS AND METHODS FOR AUTOMATICALLY PRESENTING STORED MEDIA CONTENT AT ITS BEGINNING

(71) Applicant: EchoStar UK Holdings Limited, Steeton, Keighley (GB)

(72) Inventors: Dale Mountain, Silsden (GB); Jonathan Capless, Bradford (GB)

(73) Assignee: EchoStar UK Holdings Limited, Steeton, Keighley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,591

(22) Filed: Jan. 5, 2015

(65) Prior Publication Data

US 2015/0128180 A1 May 7, 2015

Related U.S. Application Data

(63) Continuation of application No. 12/940,735, filed on Nov. 5, 2010, now Pat. No. 8,930,996.

(51) Int. Cl.
| | |
|---|---|
| *G06F 13/00* | (2006.01) |
| *H04N 21/472* | (2011.01) |
| *H04N 5/44* | (2011.01) |
| *H04N 5/445* | (2011.01) |
| *H04N 21/433* | (2011.01) |
| *H04N 21/462* | (2011.01) |
| *H04N 21/4722* | (2011.01) |
| *H04N 21/482* | (2011.01) |

(Continued)

(52) U.S. Cl.
CPC ....... *H04N 21/47217* (2013.01); *H04N 5/4403* (2013.01); *H04N 5/44543* (2013.01); *H04N 21/4147* (2013.01); *H04N 21/4331* (2013.01); *H04N 21/4334* (2013.01); *H04N 21/44004* (2013.01); *H04N 21/4622* (2013.01); *H04N 21/4722* (2013.01); *H04N 21/482* (2013.01); *H04N 21/64322* (2013.01)

(58) Field of Classification Search
CPC ............ H04N 21/482; H04N 21/4331; H04N 21/4622; H04N 21/4722; H04N 21/4403; H04N 21/44543
USPC ...................................... 725/39, 58; 386/298
See application file for complete search history.

(56) References Cited

U.S. PATENT DOCUMENTS 5,682,597 A * 10/1997 Ganek ............... H04N 21/47202  
348/E7.071  
5,724,646 A * 3/1998 Ganek ................ H04N 7/17318  
348/E7.071

(Continued)

*Primary Examiner* — Nasser Goodarzi  
*Assistant Examiner* — Michael B Pierorazio  
(74) *Attorney, Agent, or Firm* — Lowe Graham Jones PLLC

(57) ABSTRACT

Media device systems and methods are operable to automatically present a program at its beginning while a remaining portion of the program is being received at the media device. An exemplary embodiment receives a program in a media content stream; receives a presentation request to present the program, wherein the presentation request is received after an initial portion of the program has been received and wherein the presentation request is received before a conclusion of the program; accesses a stored initial portion of the program from a memory medium; and initiates presentation at a beginning of the program residing in the accessed initial portion of the program.

20 Claims, 3 Drawing Sheets

(51) Int. Cl.
*H04N 21/4147* (2011.01)
*H04N 21/44* (2011.01)
*H04N 21/643* (2011.01)

(56) References Cited

U.S. PATENT DOCUMENTS

| | | | | |
|---|---|---|---|---|
| 6,049,333 | A * | 4/2000 | LaJoie | H04N 5/44543 345/672 |
| 6,263,504 | B1 * | 7/2001 | Ebisawa | H04N 7/17318 348/E7.071 |
| 6,453,115 | B1 * | 9/2002 | Boyle | G11B 20/10 386/346 |
| 6,798,971 | B2 * | 9/2004 | Potrebic | H04N 5/4401 348/E5.105 |
| 6,971,121 | B2 | 11/2005 | West et al. | |
| 7,409,140 | B2 * | 8/2008 | Rodriguez | H04N 5/76 348/E5.007 |
| 7,505,081 | B2 * | 3/2009 | Eshleman | H04N 5/775 348/565 |
| 7,512,964 | B2 | 3/2009 | Rodriguez et al. | |
| 7,810,121 | B2 * | 10/2010 | Patel et al. | G06F 3/0482 725/102 |
| 2002/0174430 | A1 * | 11/2002 | Ellis | G11B 27/005 725/46 |
| 2002/0184638 | A1 * | 12/2002 | Agnihotri | G11B 27/36 725/89 |
| 2003/0005454 | A1 * | 1/2003 | Rodriguez | G06Q 30/0601 725/89 |
| 2003/0110514 | A1 * | 6/2003 | West | H04N 5/76 725/134 |
| 2003/0177492 | A1 * | 9/2003 | Kanou | H04N 5/44543 725/39 |
| 2003/0208767 | A1 * | 11/2003 | Williamson | G06F 3/0482 725/93 |
| 2003/0226150 | A1 * | 12/2003 | Berberet | H04N 7/17336 725/94 |
| 2004/0078829 | A1 * | 4/2004 | Patel | G06F 3/0482 725/135 |
| 2004/0133923 | A1 * | 7/2004 | Watson | G06Q 30/06 725/134 |
| 2005/0034171 | A1 * | 2/2005 | Benya | G06F 3/0482 725/143 |
| 2008/0022347 | A1 * | 1/2008 | Cohen | H04N 7/17336 725/134 |
| 2008/0092181 | A1 * | 4/2008 | Britt | H04N 7/1675 725/87 |
| 2008/0127253 | A1 * | 5/2008 | Zhang | H04N 21/478 725/35 |
| 2008/0184297 | A1 * | 7/2008 | Ellis | G11B 27/005 725/39 |
| 2009/0025027 | A1 * | 1/2009 | Craner | H04H 20/103 725/32 |
| 2009/0150941 | A1 * | 6/2009 | Riedl | H04N 7/173 725/61 |
| 2009/0320084 | A1 * | 12/2009 | Azam | H04N 7/17318 725/120 |
| 2009/0324203 | A1 * | 12/2009 | Wiklof | H04N 1/00933 386/291 |
| 2010/0043022 | A1 * | 2/2010 | Kaftan | G06Q 30/02 725/34 |
| 2010/0095323 | A1 * | 4/2010 | Williamson | H04H 20/30 725/32 |
| 2010/0217613 | A1 * | 8/2010 | Kelly | G06Q 30/02 705/1.1 |
| 2010/0218208 | A1 * | 8/2010 | Holden | G11B 27/00 725/32 |
| 2010/0242079 | A1 * | 9/2010 | Riedl | H04N 7/17318 725/115 |
| 2010/0246582 | A1 * | 9/2010 | Salinger | H04L 12/2801 370/392 |
| 2010/0251304 | A1 * | 9/2010 | Donoghue | H04N 21/25891 725/46 |
| 2010/0251305 | A1 * | 9/2010 | Kimble | H04N 7/17318 725/46 |
| 2010/0254386 | A1 * | 10/2010 | Salinger | H04L 12/2801 370/392 |
| 2010/0269146 | A1 * | 10/2010 | Britt | H04N 7/1675 725/110 |
| 2010/0293583 | A1 * | 11/2010 | Loebig | G06Q 30/0283 725/109 |
| 2010/0306401 | A1 * | 12/2010 | Gilson | H04N 5/765 709/231 |

\* cited by examiner

APPARATUS, SYSTEMS AND METHODS FOR AUTOMATICALLY PRESENTING STORED MEDIA CONTENT AT ITS BEGINNING

PRIORITY CLAIM

This patent application is a Continuation of U.S. Non-Provisional patent application Ser. No. 12/940,735, filed Nov. 5, 2010, published as U.S. Publication No. 2012/0117596 entitled "APPARATUS, SYSTEMS AND METHODS FOR AUTOMATICALLY PRESENTING STORED MEDIA CONTENT AT ITS BEGINNING" and issued as U.S. Pat. No. 8,930,996 on Jan. 6, 2015, the content of which is incorporated herewith in its entirety.

BACKGROUND

Media devices, such as a set top box, or the like, are configured to receive media content from a content provider. The media content is typically provided as a stream of information. The streaming media content provides a series of programs, such as movies, sporting events, television series, newscast programs, etc.

The media device may be configured to store the received media content for later presentation. For example, the media device may include, or be coupled to, a digital video recorder (DVR) or a recordable digital video disk (DVD) player. At some later time, a user can operate the media device, DVD player, or other device to cause retrieval and presentation of the stored media content.

At times, the user may be watching, in real time, a particular program of interest that is contained in the media content that is currently being received by the media device. In some situations, the user may choose to initiate presentation of the currently presented program of interest after its beginning. Accordingly, the user will not be able to view the missed initial portion of the program of interest.

However, in the event that the user has pre-configured their DVR or DVD player to store the program of interest in its respective memory medium, the user can access the initial portion of the stored program of interest to view the program of interest from its beginning. As the user is viewing the initial portion of the program of interest, the remaining portion of the program of interest continues to be stored into the memory medium of the DVR or DVD player as it is being received by the media device.

There are different ways of providing user access to the initial portion of the stored program of interest. In some systems, the user may navigate through a presented electronic program guide (EPG) menu that provides a listing of programs stored in the memory medium of the DVR, the DVD player, or a video on demand system (VOD). The user may then select the program of interest, via the EPG menu, to initiate presentation of the initial portion of the program of interest. However, the process of navigating through the EPG menu to identify and then select the stored program of interest may be relatively tedious and time consuming.

Alternatively, or additionally, some systems may be configured to permit the user to rewind back through the saved initial portion of the program of interest so that presentation can be resumed from the beginning. In such systems, the user is initially presented the currently received portion of the program of interest. Upon actuation of a rewind function, the media device automatically accesses the stored initial portion of the program of interest and begins to present a fast speed rewind of the stored program of interest. Thus, the user can view the reverse motion presentation, and at a point of interest, may then initiate presentation of the stored program of interest. However, this process may take some amount of time to rewind back through to the beginning of the stored program of interest. Further, a specific series of actions are required on the part of the user. Accordingly, this process may also be relatively tedious and time consuming.

Accordingly, there is a need in the arts to provide a system and method for more convenient access to a stored initial portion of a program of interest that is currently being received by a media device.

SUMMARY

Systems and methods of automatically presenting a program at its beginning while a remaining portion of the program is being received at the media device are disclosed. An exemplary embodiment receives a program in a media content stream; receives a presentation request to present the program, wherein the presentation request is received after an initial portion of the program has been received and wherein the presentation request is received before a conclusion of the program; accesses a stored initial portion of the program from a memory medium; and initiates presentation at a beginning of the program residing in the accessed initial portion of the program.

BRIEF DESCRIPTION OF THE DRAWINGS

Preferred and alternative embodiments are described in detail below with reference to the following drawings.

DETAILED DESCRIPTION

Figure 1:
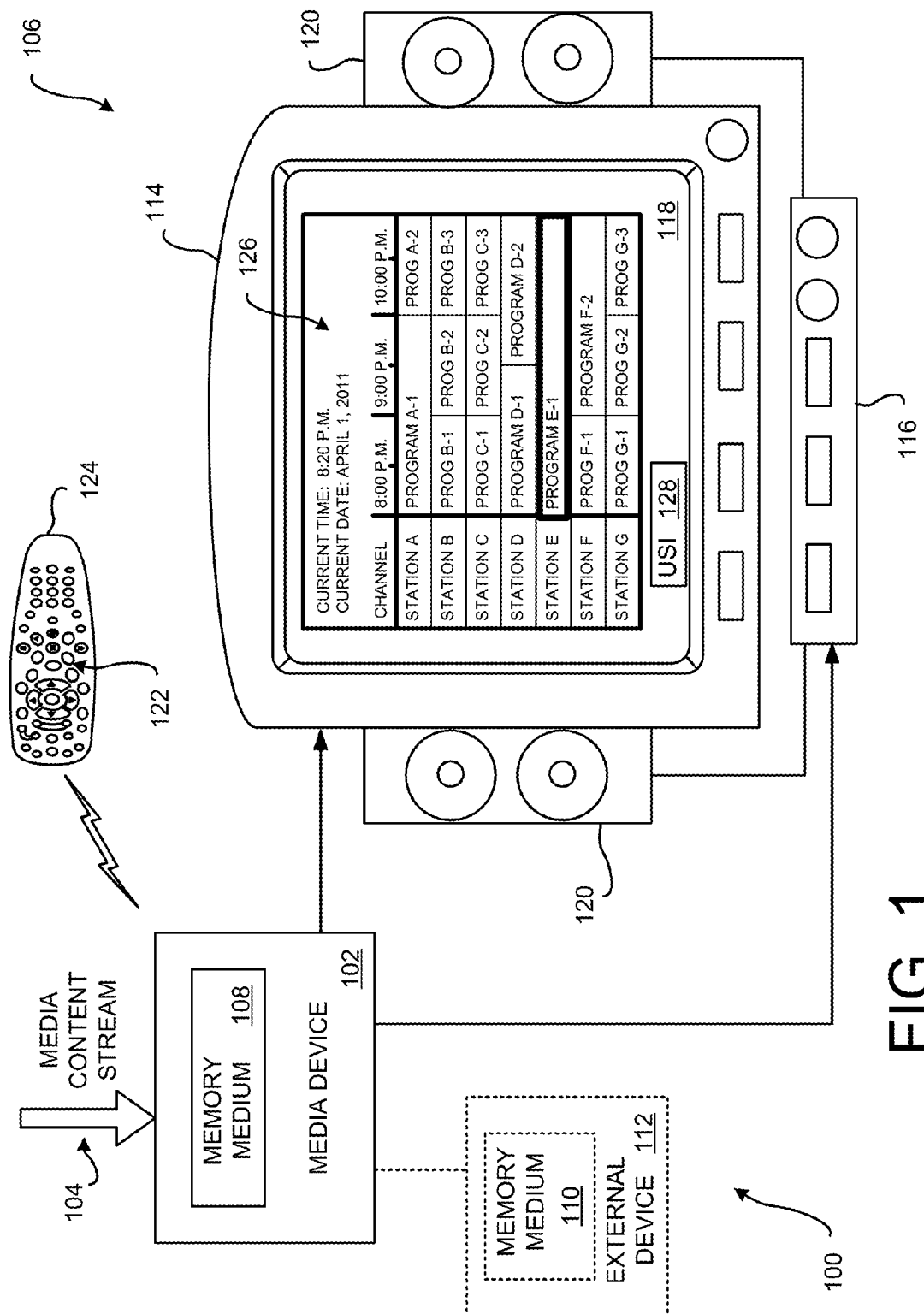
FIG. 1 is a block diagram of an embodiment of an automatic rewind system implemented in a media device.

FIG. 1 is a block diagram of an embodiment of an automatic rewind system 100 implemented in a media device 102, such as, but not limited to, a set top box (STB). Embodiments of the automatic rewind system 100 may be implemented in other media devices, such as, but not limited to digital video disc (DVD) players, digital video recorders (DVRs), game playing devices, or personal computers (PCs) that are configured to receive one or more live feed media content streams 104.

The received media content stream 104 may comprise one or more streaming types of programs. Exemplary programs may include movies, made-for-television program series, local programming, and/or special events. A user (not shown) is able to cause the media device 102 to store a selected program of interest in a memory medium 108, for example, but not limited to, a memory medium residing in the media device 102. Alternatively, or additionally, the selected program of interest may be stored in a memory medium 110 accessible by an external device 112, such as a DVD recorder, a personal computer, a cloud computing server, or the like.

In an exemplary embodiment, a user selects a program of interest for storing into the memory medium 108 (or the memory medium 110). In some instances, the user will configure the media device 102 in advance of the scheduled presentation time of the program of interest. In other instances, the user will initiate storage as the program of interest is currently being received in the media content stream 104.

In instances where the initial portion of the program of interest has been received and saved into the memory medium 108 (or the memory medium 110), but prior to the conclusion of presentation of the program of interest, embodiments of the automatic rewind system 100 are configured to automatically access the stored initial portion of the program of interest and automatically initiate presentation of the program of interest at its beginning. The automatic access and presentation occurs in response to receiving a user presentation request that selects the currently presented program of interest for presentation. That is, the beginning of the program of interest is automatically accessed and presented without additional interaction, or with relatively minimal interaction, from the user.

The exemplary media device 102 is coupled to a media presentation system 106 that includes a visual display device 114, such as a television (hereafter, generically a TV), and an audio presentation device 116, such as a surround sound receiver (hereafter, generically, a speaker). Other types of output devices may also be coupled to the media device 102, including those providing any sort of stimuli sensible by a human being, such as temperature, vibration and the like. Further, take for example that the media content stream 104 is, or includes, a "live feed" program that is currently being presented to the user. The user may watch the video portion of the currently presented live feed program on the display 118 of the TV 114 as it is being received in real time by the media device 102. Further, the user may also listen to the audio portion of the currently presented live feed program that is reproduced as sounds by the speakers 120 of the surround sound receiver 116.

At some point during the presentation of the current program, the user may decide that they would like to change to a different program. To view alternative viewing choices, the user may operate the media device 102 such that an electronic program guide (EPG) 126 is presented on the display 118 of the TV 114.

For example, the user may be interested in viewing the "Program E-1" (which is indicated as being highlighted by the bold-lining of the EPG menu box). In this example, the user would "scroll" or "navigate" about the EPG 126 to the "Program E-1" box using one or more of the controllers 122 on the remote control 124 to initiate presentation of the "Program E-1".

In this example, the "Program E-1" started at 8:00 p.m. Since the current time is 8:20 p.m. as indicated on the exemplary EPG 126, "Program E-1" has already started. When the user selects the "Program E-1" for presentation, in the absence of an embodiment of the automatic rewind system 100, the "Program E-1" is immediately presented beginning with the currently received content that is being received by the media device 102 at 8:20 p.m. In this example, the user misses the initial portion of the "Program E-1" from 8:00-8:20 p.m.

Exemplary embodiments of the automatic rewind system 100 implemented in the media device 102 automatically initiate presentation of the "Program E-1" at its beginning. In this example, in response to selection of "Program E-1" by the user, the initial portion of the stored "Program E-1" is accessed from the memory medium 108 of the media device 102 (or the memory medium 110 of the external device 112) and the stored program is presented to the user at its beginning. The remaining portion of the "Program E-1" is continued to be stored in the memory medium 108 (or the memory medium 110) so that as time progresses, the user is presented the "Program E-1" in its entirety.

Some embodiments may be configured to present a user selection interface (USI) 128, such as a selectable button, a pull-down box, a pop-up window or the like, to the user when the program of interest is selected by the user. The user selection interface 128 indicates to the user the availability of the initial portion of the selected program of interest. The user selection interface 128 is further configured to receive user input, or user confirmation, to initiate presentation of the selected program of interest at its beginning. That is, the user selection interface 128 permits the user to decide whether they wish to begin presentation of the selected program of interest at its current real time point, or to begin presentation of the program from its beginning.

For example, the selected program of interest may be a local newscast program that typically presents stories on sensational national media events before presenting report segments pertaining to local news, local sports and/or local weather. If the user is not particularly interested in the national news segments, which were likely previously covered in an earlier presented national newscast program, the user can initiate presentation at the selected program of interest at the current real-time point. On the other hand, if the user did not view the previously presented national newscast program, the user may choose to initiate presentation of the local newscast program at its beginning for viewing of the national news segments.

Figure 2:
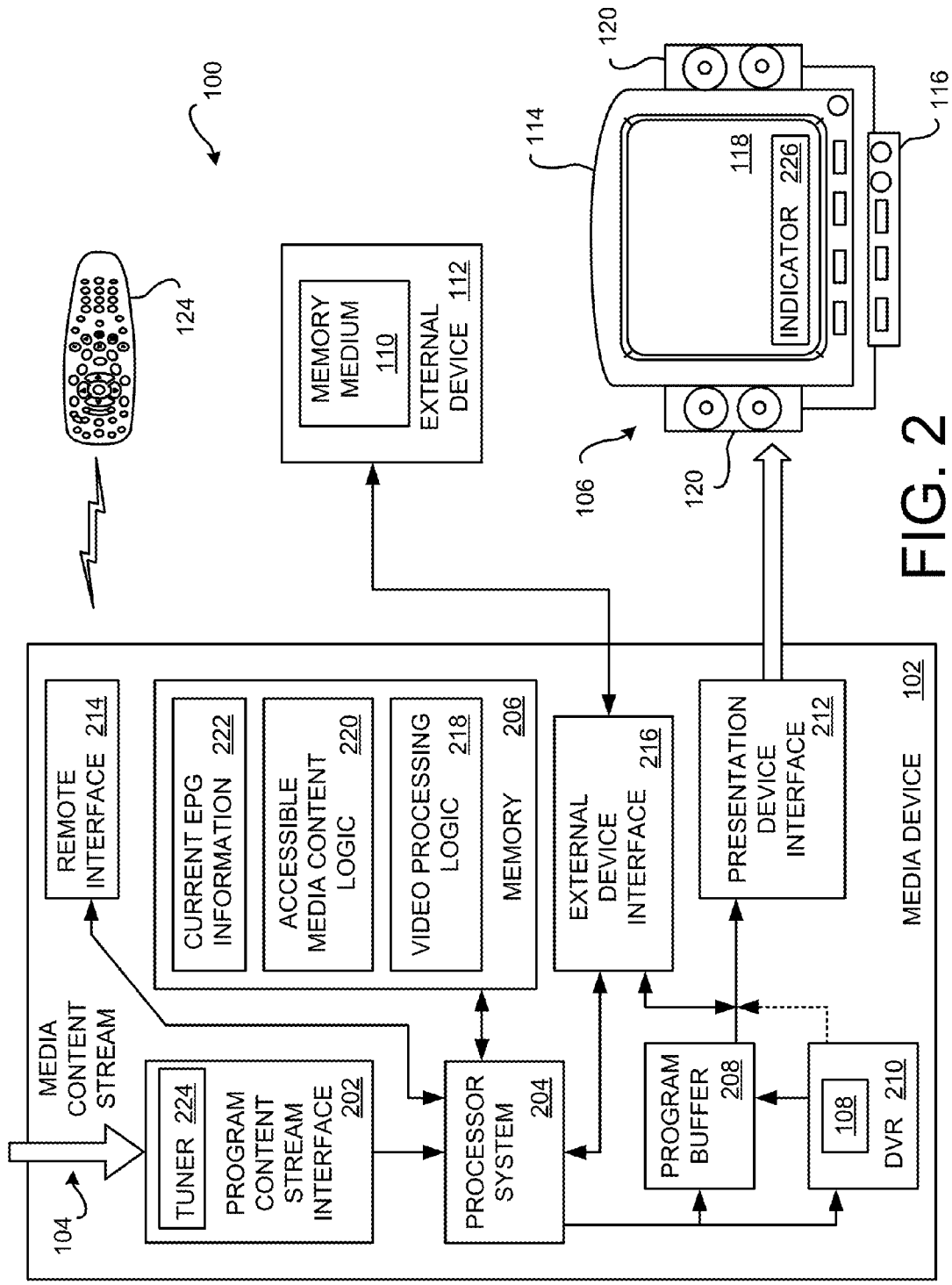
FIG. 2 is a block diagram of the automatic rewind system implemented in a set top box.

FIG. 2 is a block diagram of the automatic rewind system 100 implemented in the exemplary media device 102. The non-limiting exemplary media device 102 comprises a program content stream interface 202, a processor system 204, a memory 206, a program buffer 208, an optional digital video recorder (DVR) 210, a presentation device interface 212, a remote interface 214, and an optional external device interface 216. The memory 206 comprises portions for storing the video processing logic 218, the stored media content access logic 220, and electronic program guide (EPG) information 222. In some embodiments, the video processing logic 218 and the stored media content access logic 220 may be integrated together, and/or may be integrated with other logic. In other embodiments, some or all of these memory and other data manipulation functions may be provided by and using remote server or other electronic devices suitably connected via the Internet or otherwise to a client device. In the exemplary media device 102, the memory medium 108 that is configured to store selected programs resides in, or is integrated with, the DVR 210. Further, additional components not described herein may be included in alternative embodiments.

The functionality of the media device 102, here a set top box, is now broadly described. A media content provider provides a plurality of programs that are received in one or more media content streams 104. The media content streams 104 are received by the program content stream interface 202. One or more tuners 224 in the program content stream interface 202 selectively tune to one of the media content streams 104 providing the program of interest that the user is interested in viewing. The processor system 204, executing the video processing logic 218 and based upon a request for a program of interest specified by a user, parses out program content from the received media content stream 104 that is associated with the selected program of interest. The selected program of interest is then assembled into a stream of video and/or audio information which may be stored by the program buffer 208 such that the program content is streamed out to the media presentation system 106 via the presentation device interface 212. Alternatively, or additionally, the selected program of interest may be saved into the DVR 210 for later presentation. The DVR 210 may be directly provided in, locally connected to, or remotely connected to, the media device 102.

When the user is interested in viewing a program of interest, the user actuates the remote control 124 to cause the processor system 204 to retrieve and present the EPG 126 on the display 118. The user may then select from the presented EPG 126 the program of interest that is currently being received in the media content stream 104. In the instance where the program of interest has been previously stored in the DVR 210, or has at least the initial portion stored in the DVR 210, the automatic rewind system 100 automatically accesses the stored initial portion of the program of interest, and initiates presentation of the program of interest at its beginning using the accessed initial portion of the program of interest.

In some embodiments, the media device 102 may be communicatively coupled to the external device 112, via the external device interface 216. The user may elect to store the program of interest into the memory medium 110 that is accessible by the external device 112. Accordingly, the processor system 204 may operate the program buffer 208 and/or the DVR 210 so that the program of interest is communicated to the external device 112 for storage. The processor system 204 may also communicate instructions to the external device 112 to control, or partially control, operation of the external device 112.

In situations where a user presentation request is received to initiate presentation of a currently received program of interest that has at least its initial portion stored in the memory medium 110 that is accessible by the external device 112, embodiments of the automatic rewind system 100 cause the processor system 204 to communicate instructions to the external device 112 to access the program of interest. The stored program of interest is accessed from the memory medium 110, at its beginning, and is communicated to the media device 102. The media device 102 then initiates presentation of the selected program of interest at its beginning using the received initial portion of the program of interest.

In some instances, the entirety of the program of interest is stored in the memory medium 110 that is accessible by the external device 112. For example, the external device 112 may be a DVD player and/or recorder, and the program of interest may be stored on a DVD. Accordingly, the entire stored program of interest is accessed from the memory medium 110 and is communicated to the media device 102. The media device 102 then initiates presentation of the beginning of the program of interest that is received from the external device 112. In some embodiments, the external device 112 and/or the media device 102 may be provided by any combination of hardware and/or software, including, but not limited, to a cloud computing server and or other server-based system. Such media devices 102 and/or external device 112 may be suitably connected to such server-based systems in any suitable manner.

Some embodiments are configured to present an indicator 226 on the display 118 of the TV 114. The indicator 226 indicates to the user that they are viewing the selected program of interest as a live feed program, or that they are viewing the recorded initial portion of the selected program of interest. The indicator 226 may be a message and/or meaningful icon that is presented on the display 118 of the TV 114. In some embodiments, the presented indicator 226 may a partially transparent watermark that is presented over a portion of the presented program of interest. Alternatively, or additionally, the indicator 226 may be an illumination device, such as a light emitting diode, lamp or the like, located on the surface of the remote control 124, the media device 102, the TV 114, or the like.

Figure 3:
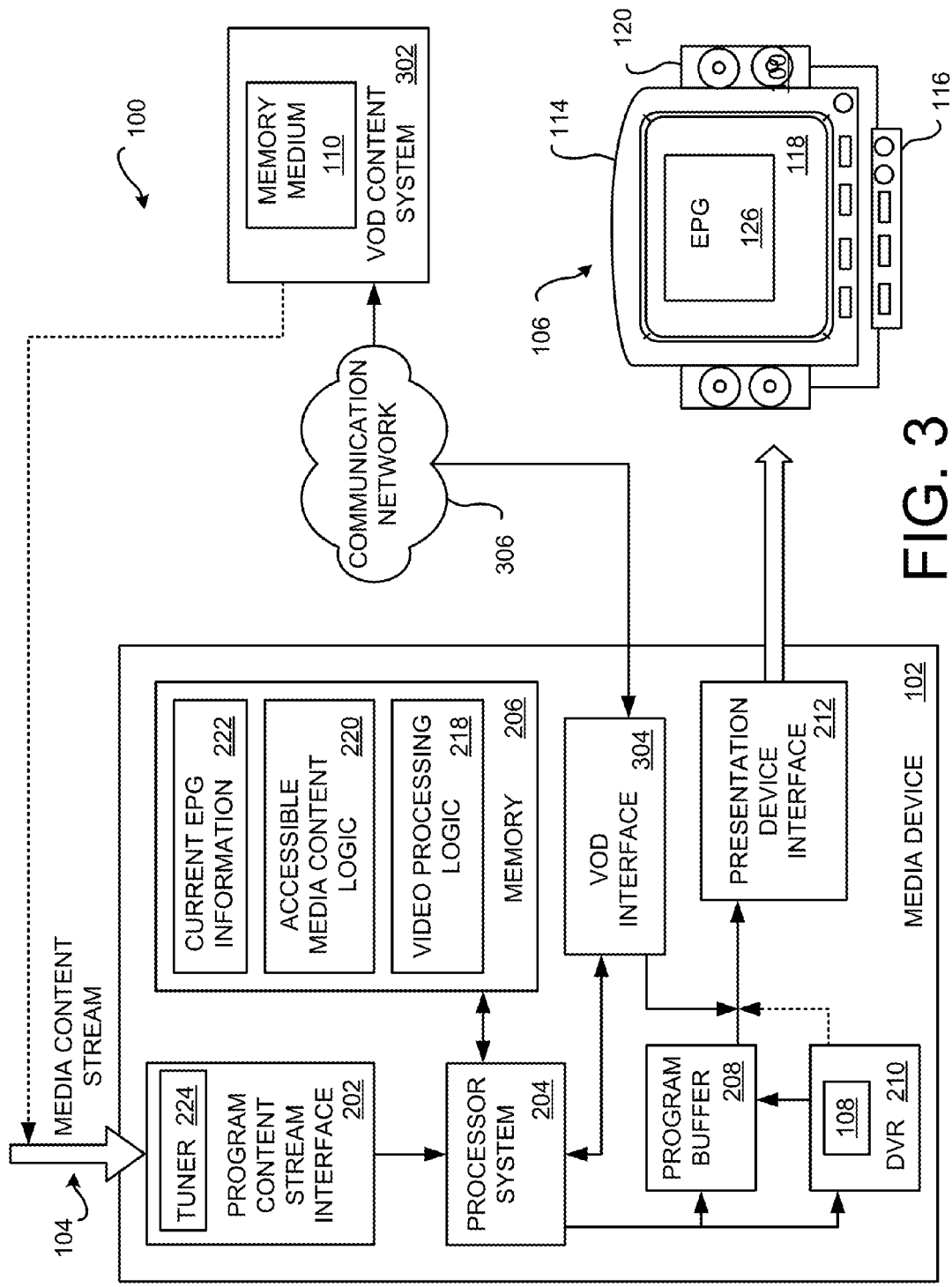
FIG. 3 is a block diagram of the automatic rewind system implemented in an exemplary media device that is configured to access a video on demand system.

FIG. 3 is a block diagram of the automatic rewind system 100 implemented in an exemplary media device 102 that is configured to access a video on demand (VOD) content system 302. In this exemplary embodiment, the media device 102 and the VOD content system 302 are communicatively coupled together via the communication network 306. The communication network 306 is illustrated as a generic communication system. In an exemplary embodiment, the communication network 306 comprises the Internet. Accordingly, the exemplary VOD interface 304 is a suitable modem or Internet connection device.

Alternatively, the communication network 306 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 may be configured to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, the communication network 306 may be employ combination systems having a plurality of segments which employ different formats for each segment, and/or may employ different technologies on different segments.

In some situations, the user may initiate presentation of a currently received program of interest, such as by selecting the program of interest using the presented EPG 126. However, the program of interest may also be available from the VOD content system 302. Some embodiments of the automatic rewind system 100 cause the processor system 204 to communicate a request to the VOD content system 302 to access the program of interest residing in the memory medium 110 in response to the user selecting the currently presented program of interest from the EPG 126.

The program of interest stored on the VOD content system 302 is accessed from the memory medium 110, at its beginning, and is communicated to the media device 102. In an exemplary embodiment, the stored program of interest may be communicated to the media device 102 in the media content stream 104. Alternatively, the stored program of interest may be communicated to the media device 102 via the communication network 306. The media device 102 then initiates presentation of the selected program of interest at its beginning using the received initial portion of the program of interest.

In this exemplary embodiment, the user does not have to be aware of the availability of their selected program of interest in the VOD content system 302, stop presentation of the currently received selected program of interest, access the VOD content system 302, locate the program of interest in the VOD content system 302, and then finally operate the VOD content system 302 to provide their selected program of interest to the media device 102. Rather, embodiments of the automatic rewind system 100 are configured to automatically access and present the selected program of interest that is available from the VOD content system 302. Accordingly, inconvenience to the user is avoided since the user does not have to manually access the program of interest from the VOD content system 302. Further, the user may be provided a richer viewing experience in situations where the program of interest is a higher quality program, such as a high definition version, as compared to situations where the currently received version of the program of interest is a standard version interlaced with commercials and other program presentation interrupting segments.

In an alternative embodiment, only the initial portion of the program of interest is received from the VOD content system 302 and is automatically presented to the user. The remaining portion of the program of interest is stored in the DVR 210 as it is being received in the media content stream 104. The stored remaining portion of the program is accessed from the DVR 210 and presented upon conclusion of presentation of the received initial portion of the program received from the VOD content system 302. Accordingly, bandwidth that would otherwise be used over the communication network 306 to communicate the entire program of interest from the VOD content system 302 to the media device 102 is conserved.

Some embodiments are configured to permit the user to enable or disable the automatic rewind system 100. In an exemplary embodiment, the automatic rewind system 100 may be enabled/disabled by the user via a control menu. A selection box or the like may be presented on the menu. The selection box may indicate the current operating status of the automatic rewind system 100 (enabled or disabled), and provide a selection area that will either enable or disable the automatic rewind system 100. Alternatively, or additionally, one or more of the controllers 122 on the remote control 124 may be actuated by the user to enable or disable the automatic rewind system 100. Operation of the controllers 122 may be used in conjunction with the control menu that indicates the operating status of the automatic rewind system 100.

It should be emphasized that the above-described embodiments of the automatic rewind system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for presenting a program of interest, the method comprising:
   receiving a request to record the program of interest at a media device, wherein the request to record the program of interest is received in advance of a scheduled presentation time of the program of interest;
   receiving the program of interest at the media device in a media content stream;
   recording an initial portion of the program of interest in a memory medium of the media device,
      wherein the recording of the initial portion of the program of interest occurs when the program of interest begins to be received at the media device;
   presenting an electronic program guide (EPG) on a display, wherein the presented EPG indicates that the program of interest is currently being received at the media device, and wherein the EPG indicates that the program of interest has not yet concluded;
   receiving a presentation request made via the EPG to present the program of interest,
      wherein the presentation request is received after an initial portion of the program of interest has been received, and
      wherein the presentation request is received before the conclusion of the program of interest;
   accessing, in response to the presentation request, the recorded initial portion of the program of interest from the memory medium of the media device; and
   presenting the accessed initial portion of the program of interest on the display.

2. The method of claim 1, further comprising:
   continuing to record a remaining portion of the program of interest while the initial portion of the program of interest is being presented;
   accessing, in response to completing presentation of the recorded initial portion of the program of interest, the recorded remaining portion of the program of interest; and
   presenting the accessed remaining portion of the program of interest on the display.

3. The method of claim 2, wherein the memory medium of the media device is a first memory medium, and wherein continuing to record the remaining portion of the program of interest comprises:
   recording the remaining portion of the program of interest received in the media content stream in a second memory medium of the media device,
   wherein the second memory medium is different from the first memory medium.

4. The method of claim 3,
   wherein the first memory medium is a digital video recorder (DVR) residing in the media device,
   wherein the second memory medium is a program buffer, and
   wherein the program buffer stores a generated stream of video and audio information corresponding to the program of interest that is streamed out to a media presentation system.

5. The method of claim 2, further comprising:
   recording the remaining portion of the program of interest in the memory medium.

6. The method of claim 5, wherein the memory medium is a digital video recorder (DVR) residing in the media device.

7. The method of claim 1, wherein the program of interest was previously recorded in its entirety before the presentation request is received.

8. The method of claim 1, further comprising:
   presenting an indicator on the display with the presented EPG, wherein the indicator is configured to indicate that the presentation request made via the presented EPG will initiate presentation of the program of interest from its beginning.

9. A media device, comprising:
   a program content stream interface configured to receive a media content stream, wherein the media content stream, when currently received at the program content stream interface, includes a program of interest;
   electronic program guide (EPG) information that is used to generate an EPG that is presented on a display to a user, wherein the EPG indicates that a plurality of programs are currently scheduled for presentation, and wherein the program of interest is listed in the EPG as one of the plurality of programs that are currently scheduled for presentation;
   a memory medium communicatively coupled to the program content stream interface and configured to store the program of interest as the program of interest is received at the program content stream interface; and
   a processor system communicatively coupled to the memory medium, wherein the processor system is configured to:

receive a user recording request to store the program of interest in the memory medium when the program of interest is received at the program content stream interface, wherein the user recording request is received in advance of a scheduled presentation time of the program of interest;

store an initial portion of the program of interest in the memory medium when the program of interest begins to be received at the program content stream interface;

receive a user presentation request to present the program of interest,
  wherein the user presentation request is based on the user navigating about a currently presented EPG generated from the EPG information, and
  wherein the user presentation request is made by the user selecting the program of interest via the currently presented EPG;

automatically access the initial portion of the program of interest from the memory medium in response to the received user presentation request; and present the accessed initial portion of the program of interest, wherein the user presentation request is received after an initial portion of the program of interest has been received, and wherein the presentation request is received before a remaining portion of the program of interest is received at the program content stream interface.

10. The media device of claim 9, wherein the media device is a set top box (STB), wherein the program content stream interface is configured to receive a plurality of media content streams, and wherein the program content stream interface of the STB comprises:
  at least one tuner,
  wherein the processor system is further configured to:
    determine from the EPG information which one of the plurality of media content streams the program of interest is received in, and
    tune the at least one tuner to receive the media content stream having the program of interest therein.

11. The media device of claim 9, wherein the memory medium is a digital video recorder (DVR).

12. The media device of claim 11, wherein the memory medium is a digital video recorder (DVR) residing in the media device, the media device further comprising:
  a memory that stores the EPG information.

13. The media device of claim 9, wherein the processor system is further configured to store the remaining portion of the program of interest while the initial portion of the program of interest is being presented.

14. The media device of claim 13, wherein the memory medium is a digital video recorder (DVR) residing in the media device, the media device further comprising:
  a program buffer,
    wherein the program buffer stores a generated stream of video and audio information corresponding to the program of interest that is streamed out to a media presentation system; and
    wherein the remaining portion of the program of interest is stored into the program buffer.

15. A method for presenting a program of interest, the method comprising:
  presenting an electronic program guide (EPG) on a display, wherein the presented EPG indicates that the program of interest is currently being received at a media device in at least one media content stream,
    wherein at least one media content provider provides a plurality of programs that are received in the at least one of a plurality of media content streams, and
    wherein the EPG indicates that the program of interest has not yet concluded and is currently being received in the at least one media content stream;
  receiving a presentation request made via the EPG to present the program of interest, wherein the presentation request is received before the conclusion of the program of interest;
  accessing, in response to the presentation request, an initial portion of the program of interest; and
  presenting the accessed initial portion of the program of interest on the display.

16. The method of claim 15, wherein accessing the initial portion of the program of interest comprises:
  accessing a video on demand (VOD) system, wherein the initial portion of the program of interest is communicated form the VOD system to the media device.

17. The method of claim 16, further comprising:
  recording, into a digital video recorder (DVR) of the media device, a remaining portion of the program of interest while the initial portion of the program of interest is being presented, wherein the remaining portion of the program of interest begins in response to receiving the user presentation request;
  accessing, in response to completing presentation of the recorded initial portion of the program of interest, the recorded remaining portion of the program of interest; and
  presenting the accessed remaining portion of the program of interest on the display.

18. The method of claim 16, further comprising:
  recording, into a program buffer of the media device, a remaining portion of the program of interest while the initial portion of the program of interest is being presented,
    wherein the program buffer stores a generated stream of video and audio information corresponding to the program of interest that is streamed out to a media presentation system; and
    wherein the remaining portion of the program of interest begins in response to receiving the user presentation request;
  accessing, in response to completing presentation of the recorded initial portion of the program of interest, the recorded remaining portion of the program of interest; and
  presenting the accessed remaining portion of the program of interest on the display.

19. The method of claim 16, wherein the initial portion of the program of interest is communicated to the media device in one of the plurality of media content streams provided by the at least one media content provider.

20. The method of claim 16, wherein the initial portion of the program of interest is communicated to the media device over the Internet.

* * * * *